350-96.11 SR
XR 3,860,405

United States [11] 3,860,405
Coucoulas et al. [45] Jan. 14, 1975

[54] BONDING OF OPTICAL COMPONENTS

[75] Inventors: Alexander Coucoulas, Bridgewater Township, Somerset County; Franklin Winston Dabby, Ewing Township, Mercer County, both of N.J.

[73] Assignee: Western Electric Company, Inc., New York, N.Y.

[22] Filed: Nov. 13, 1972

[21] Appl. No.: 306,243

[52] U.S. Cl. .......................... 65/42, 29/472.9, 65/4, 65/58, 65/59, 65/DIG. 7, 350/96 WG
[51] Int. Cl. .......................... C03b 23/20
[58] Field of Search .......... 65/59, DIG. 7, 4, 42, 58; 350/96 WG; 29/472.9, 471.1, 493

[56] References Cited

UNITED STATES PATENTS

| | | | |
|---|---|---|---|
| 3,240,850 | 3/1966 | Hess | 65/59 X |
| 3,347,649 | 10/1967 | Singer | 65/DIG. 7 |
| 3,473,872 | 10/1969 | Okamura | 65/DIG. 7 |
| 3,650,454 | 3/1972 | Coucoulas | 29/471.1 X |
| 3,696,985 | 10/1972 | Herring et al. | 29/471.1 X |
| 3,714,706 | 2/1973 | Reizman et al. | 65/59 X |

OTHER PUBLICATIONS

IBM Technical Disclosure Bulletin, E. A. Ash et al., Vol. 13, No. 9, Feb. 1971.

*Primary Examiner*—Robert L. Lindsay, Jr.
*Attorney, Agent, or Firm*—B. W. Sheffield

[57] ABSTRACT

Optical waveguides, for example, clad or unclad optical fibers, are bonded to a substrate, or other workpiece, by the application of mechanical and/or thermal energy. In one embodiment, the energy is applied directly to the bond region. In a second embodiment, the energy is applied to the bond region through a compliant bonding member. Techniques for forming crossovers between two or more waveguides and for forming splices between waveguides are also disclosed.

5 Claims, 24 Drawing Figures

THERMAL EXPANSION OF BK 7 GLASS AS A FUNCTION OF TEMPERATURE

CHANGE IN VISCOSITY WITH TEMPERATURE OF A TYPICAL SODA-LIME-SILICA

BONDING OF OPTICAL COMPONENTS

BACKGROUND OF THE INVENTION

1. Field of the Invention

Broadly speaking, this invention relates to bonding. More particularly, this invention relates to methods and apparatus for bonding optical components and waveguides by the application of heat and/or pressure, directly or through a compliant bonding medium.

2. Discussion of the Prior Art

The discovery of the laser has led to the development of optical communication systems which are essentially analogs of the more conventional, electrical communication systems. In these conventional systems, the current trend is in a direction which leads away from the use of discrete components and towards the use of miniaturized, integrated circuits, and the like. Not surprisingly, this trend is also found in optical communications where discrete optical components are rapidly being replaced by integrated optical circuitry.

In an integrated optical circuit, active devices, such as lasers and modulators, and passive devices, such as waveguides and filters, are physically supported by, and functionally interconnected on, an optical substrate, for example, of glass or fused silica.

The problems of manufacturing an integrated optical circuit have been found to be quite different from those encountered in the manufacture of integrated electronic circuitry. For example, in a conventional integrated circuit, the substrate is typically nonconductive, (e.g., ceramic) and to interconnect the components mounted on the substrate, conductive paths are fabricated onto the surface of the substrate, for example, by selectively metalizing portions of the substrate through a mask.

Since the substrate is nonconductive, no significant current leakage into the substrate is possible and no special consideration need therefore be given to the electrical quality of the metal to ceramic bonds, other than ensuring that a satisfactory physical bond has, in fact, been attained.

By way of contrast, the preferred substrate for optical, integrated circuits is a sheet of glass or fused silica, and such material is, of course, inherently capable of transmitting light. Accordingly, depending upon the application, it may be necessary to form the bond between the light-conductive path (i.e., the waveguide) and the substrate in such a manner that scattering of light into the substrate is minimized or, alternatively, that the maximum possible amount of light be transferred from the guide into the substrate. On occasion, it may also be necessary to bond an optical waveguide to a metallic workpiece. Since metals absorb light to a high degree, in this instance it is important that transfer of light from the waveguide into the metallic workpiece be minimized. Further, waveguides themselves must be joined and, as with conventional waveguides, it is very important that there be no significant discontinuity at the bonding interface, else considerable signal attenuation may be experienced.

In the past, adhesives have been used to create these types of bonds. However, the use of adhesives, while satisfactory in the laboratory, poses severe practical problems if the optical bonds are to be produced on a mass production basis. Furthermore, the adhesive may have an index of refraction which differs from that of both the optical component and the substrate, thus, an additional complicating factor is added to the bonding problem, namely, the effect that the adhesive may have on the optical performance of the bonded workpieces or waveguides.

The problem, then, is to provide methods and apparatus for bonding optical components and waveguides to substrates, and the like, and to one another, in such a manner that a firm, permanent bond is established without deleteriously affecting the optical performance of the bonded components, for example by increasing scattering or absorptive loss.

SUMMARY OF THE INVENTION

As a solution to this problem, a first embodiment of the invention comprises a method of bonding a first, glass workpiece to a second glass workpiece. First, the first workpiece is oriented with respect to a predetermined bond region on the second workpiece. Then, sufficient mechanical, thermal and/or vibratory energy is applied to the bond region to cause the first and/or the second workpieces to deform, and to raise the workpieces to at a temperature falling between the transformation temperature and the softening temperature of at least one of the workpieces, to bond the workpieces together without deleteriously affecting the optical characteristics of the workpieces.

In a second embodiment, the invention comprises a method of bonding first and second glass workpieces, one to the other. The first workpiece is initially placed on a support. Next, the second workpiece is positioned proximate the first workpiece, about the desired bond region. Then, a compliant medium, capable of yielding or deforming about the second workpiece is positioned over the second workpiece and the first workpiece and compliant medium are clamped together by a bonding tool.

Finally, sufficient mechanical, thermal and/or vibratory energy is applied to the bond region to deform the medium around the second workpiece, and to raise the workpieces to a temperature falling between the transformation temperature and the softening temperature of at least one of the workpieces to thereby bond the workpieces together.

The invention will be more fully understood from the following detailed description, when read with the accompanying drawings, in which:

DETAILED DESCRIPTION OF THE INVENTION

The invention will first be discussed with reference to the bonding of optical waveguides in an integrated optical circuit. One skilled in the art will realize, however, that the invention is not so limited.

Figure 1:
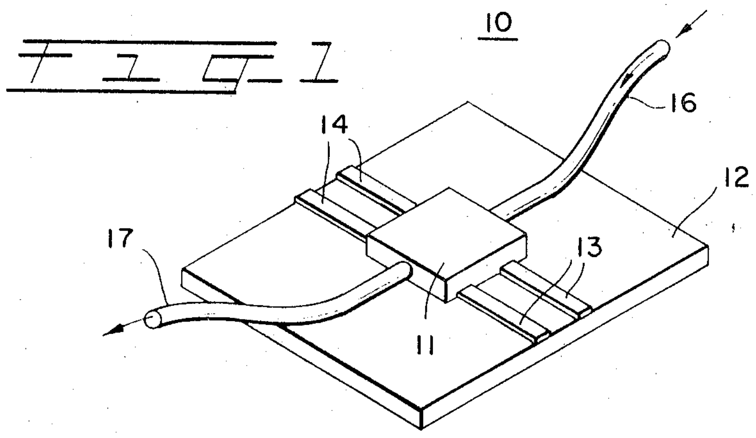
FIG. 1 is an isometric view of an integrated optical circuit, and associated waveguides, of the type that may be bonded according to the methods of this invention.
Figure 2:
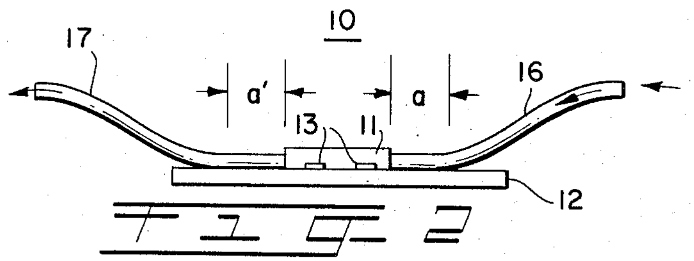
FIG. 2 is a cross-sectional view of the circuit shown in FIG. 1.

FIGS. 1 and 2 depict an integrated optical circuit 10. As shown, integrated circuit 10 comprises an active optical device 11, for example a modulator, mounted to an optical substrate 12. It will be appreciated that integrated circuits are typically far more complex than that shown. However, the configuration of FIGS. 1 and 2 is adequate to describe the principles of this invention.

Returning now to FIG. 1, a pair of electrically conductive paths 13—13, deposited on substrate 12 by any of several known techniques, supply electrical power to device 11 from an external source (not shown). In like manner, a pair of conductive paths 14—14 supply, for example, audio-frequency modulating signals to device 11.

Unmodulated light enters device 11 by means of a first optical fiber (i.e., waveguide) 16, one end of which is connected to some suitable source of illumination (not shown), typically a laser or a light-emitting diode. As can be more clearly seen from FIG. 2, the end of fiber 16 which is coupled to device 11 is bonded to the surface of substrate 12 over a short distance *a*, which is typically less than the distance between the device and the edge of the substrate. This distance must be sufficiently great that a sturdy, permanent connection is established between the fiber and the substrate, thus inhibiting motion of the fiber relative to the input port of device 11. Since fiber 16 is relatively flexible, the free end thereof may be bent or twisted, in any convenient manner, to connect the fiber to the external circuitry with which the integrated circuit is to function. Of course, the bending must not be so severe that the critical radius of the fiber is exceeded.

In an analogous manner, a second optical fiber (waveguide) 17 is bonded to substrate 12 over a distance *a'* and coupled to the exit port of device 11. If, for example, device 11 is a modulator, unmodulated light will enter integrated circuit 10 through fiber 16, and be modulated therein in accordance with the modulating signals applied to conductive paths 14. The now modulated light beam will exit from the integrated circuit through the exit port and be coupled into fiber 17. One skilled in the art will appreciate that in an integrated circuit having a plurality of active and/or passive devices mounted thereon, the connections between the various devices will be effected by a plurality of discrete optical fiber sections, each section being bonded to the substrate between the various devices which are to be optically interconnected.

As previously discussed, fibers 16 and 17 may be bonded to substrate 12 by the use of an optical adhesive, but this is not a practical technique for mass production. U.S. Pat. No. 3,533,155, which issued to A. Coucoulas on Oct. 13, 1970, and which is assigned to the assignee of the instant invention, discloses, inter alia, a method of forming metal-to-metal bonds by the application of heat, and/or mechanical pressure to the workpiece, for example, through a compliant bonding medium, such as a thin sheet of 2024 aluminum.

Because the mechanical properties of glass and fused silica differ radically from those of metals, it was heretofore thought impossible to apply the principles of compliant bonding to the bonding of glass and fused silica. We have discovered, however, that by the choice of appropriate bonding parameters, highly satisfactory glass-to-glass, and glass-to-metal bonds may be made by the compliant bonding technique of this invention. As used herein, the term "glass" includes fused silica, with or without impurities added, and other dielectric materials. Bonds between glass and crystalline material may also be effected by the techniques of this invention. Surprisingly, bonds produced by this novel technique are, in general, superior to bonds which are formed by the use of adhesives, for example, in the preservation of the optical properties in the fibers and the long-range reliability of the bonds.

Figure 3:
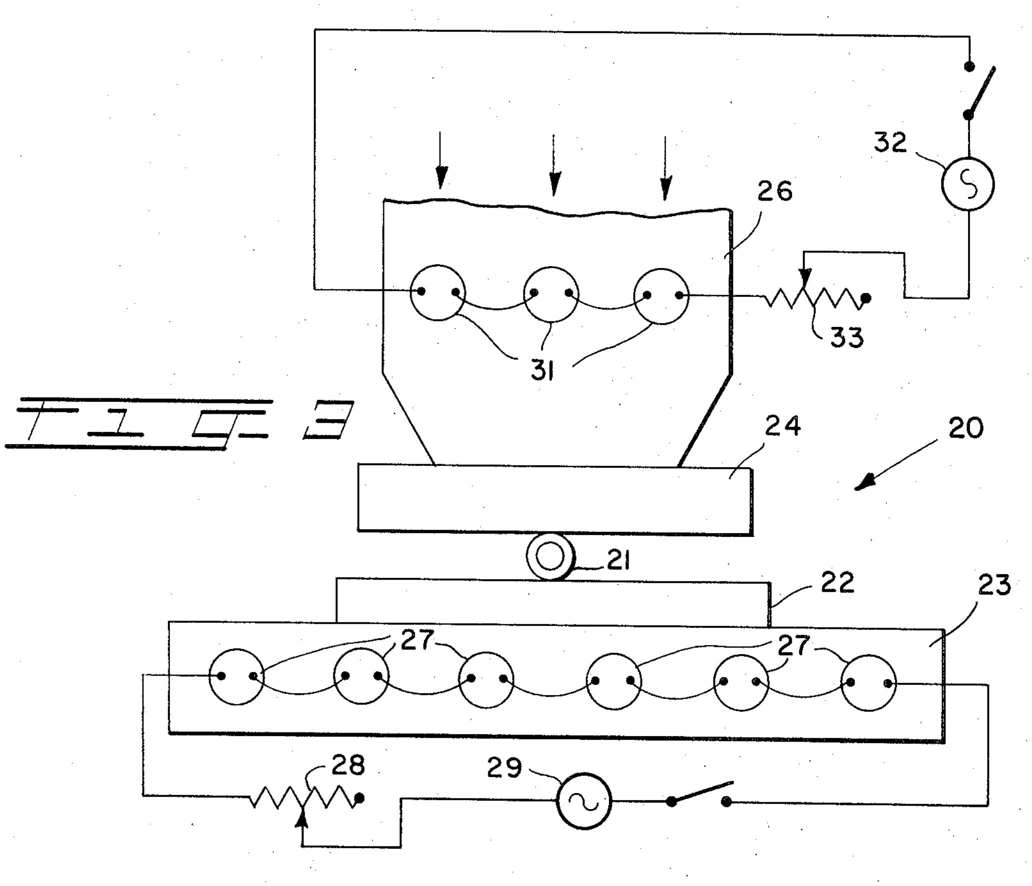
FIG. 3 is a partially-schematic, partially-side view of an illustrative apparatus for practicing the methods according to this invention.

As shown in FIG. 3, a preferred form of bonding apparatus 20 comprises a base member 23 and a movable ram 26. The ram is adapted for closing engagement with the base by means of any suitable mechanism (not shown), for example, an hydraulic cylinder, a solenoid or a simple, manually operated movement (e.g., a vise grip). A plurality of electrical heating elements 27, or the like, are connected, via a rheostat 28, to an electrical source 29 to raise the temperature of the base to some predetermined value. In like fashion, a plurality of heating elements 31 are associated with ram 26 to raise the ram to another, generally higher temperature. The substrate 22, to which the optical fiber is to be bonded, is placed upon base 23, which has priorly been allowed to attain a steady operating temperature, for example, 300°C. Next, the fiber 21 is positioned over the desired bond region and a sheet of compliant material 24 is interposed between the fiber and the ram, which also has been priorly allowed to reach a steady temperature, higher than the temperature of the base, for example 560°C. Next, the heated ram is forced down against the base, for example, with a force of 230 pounds, to deform the compliant member about the optical fiber, thereby bonding the fiber to the substrate. Actually, the particular base and ram temperatures employed are not the critical factors, as it is the temperature at the bond region which is determinative of the bond quality and this is a function of the physical properties of the workpieces. For example, for a glass optical fiber clad with soda-lime silicate glass available under the trade name Kimble R–2 glass bonded to fused silica, the bond interface temperature yielding the best bond was found to be near 560°C, i.e., the transition or deformation temperature of the glass. The actual bond pressure is a function of the area of the bond region and the geometry, and inherent physical properties, of the compliant medium.

The material of which compliant member 24 is comprised is a function of the hardness of the workpieces to be bonded. U.S. Pat. No. 3,533,155, referred to above, discusses the manner in which the compliant member 24 should be selected, once the properties of the workpieces are known. However, the above-referenced patent teaches that the compliant bonding member is preferably coated with a tough, adherent oxide surface. One of the members disclosed in that patent, 2024 aluminum, exhibits this property. We have discovered, however, that contrary to the teachings of U.S. Pat. No. 3,533,155, for bonding of glass and silica workpieces, an oxide-free compliant member is preferred. One compliant member that has been found to be satisfactory comprises a gold-plated sheet of cold-rolled copper, 10 mils thick. Other materials may, of course, be employed for the compliant member; however, we have found that if there is any appreciable amount of oxide present on the surfaces of the compliant medium, the fiber and/or the substrate tend to stick to the compliant member. Further, there is a tendency to transfer oxide particles from the compliant member to the optical fiber, with a consequent degradation in the optical transmission characteristics of the fiber. Accordingly, materials which do not form the more stable oxides are preferred and these include the precious metals such as platinum, palladium, rhodium, irridium, as well as silver and gold. The compliant member need not, of course, be fabricated entirely from these oxide-inhibiting precious metals. A compliant member fabricated from a base metal or polymer, for example a polyimide film available commercially as a Kapton film may be plated with a layer of precious metal and the plated layer need not be more than a few microns thick. Since, in general, a compliant member may only be used one time, this may result in a considerable cost saving. Of course, a solid compliant member may be salvaged and reformed after use with a minimum of cost. It is also possible to use polymers such as polytetrafluoroethylene, available commercially as Teflon film or polyimide to eliminate sticking between the compliant member and the workpieces.

Figure 4:
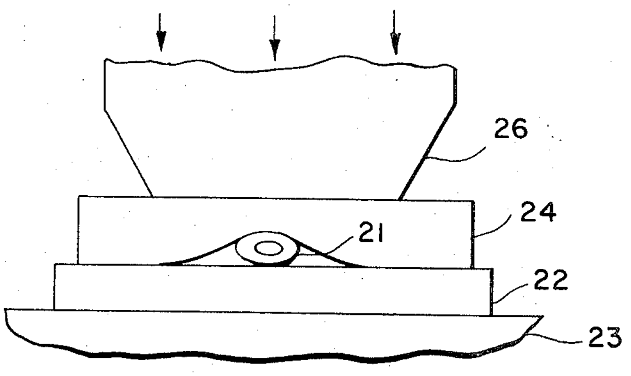
FIG. 4 is a partial side view of the apparatus shown in FIG. 3 depicting the situation after an optical waveguide has been bonded to a substrate according to the methods of this invention.

FIG. 4 illustrates the bond region after the heated ram, discussed above with respect to FIG. 3, has been forced downwardly towards base 23 with a force sufficient to cause deformation of the compliant member. As can be seen from the figure, compliant member 24 is deformed about the optical fiber, which itself is slightly deformed during the bonding process, to approximately an elliptical cross section. The exact mechanism by which a bond is formed between the optical fiber and the substrate is not fully known, but it is believed that the heat and/or pressure, applied through the compliant member, causes a partial deformation of the fiber and that in this condition the glass or fused silica comprising the outer cladded surface of the fiber "wets" the surface of the substrate and adheres thereto. The same is, of course, true if the fiber is a solid fiber, rather than a clad fiber.

We have also discovered that the quality of the bond is improved if both the fiber and the substrate are thoroughly cleaned prior to the bonding process. A still further improvement in bond quality results if the substrate is allowed to remain on the heated base for a short interval of time, typically one minute, after the bond has been formed. Again, the exact mechanism is not fully understood, but it is postulated that some sort of stress relief or annealing takes place in either the optical fiber and/or the substrate under these conditions. In some applications the bond quality is further improved if vibratory energy is applied to the bonding ram, for example, from an ultrasonic oscillator. This vibratory energy may be in addition to, or in lieu of, the normal bonding energy applied to the bond region.

Figure 5:
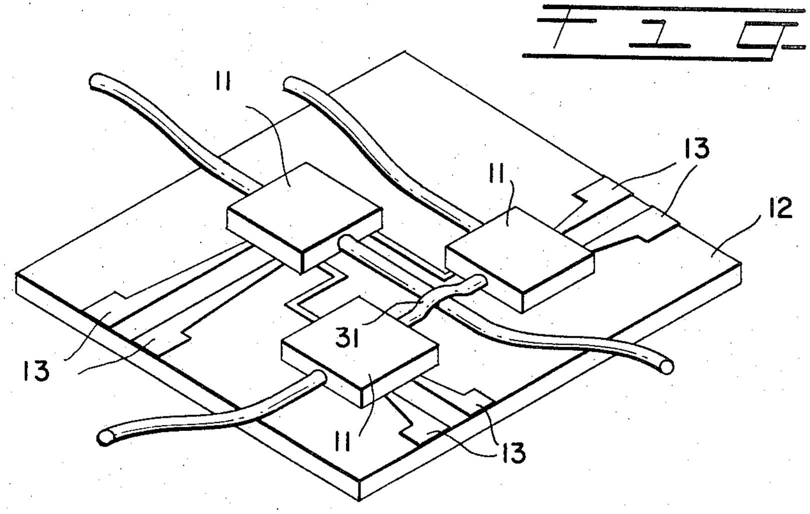
FIG. 5 is an isometric view of an integrated optical circuit including a crossover formed between two optical waveguides according to the methods of this invention.
Figure 6:
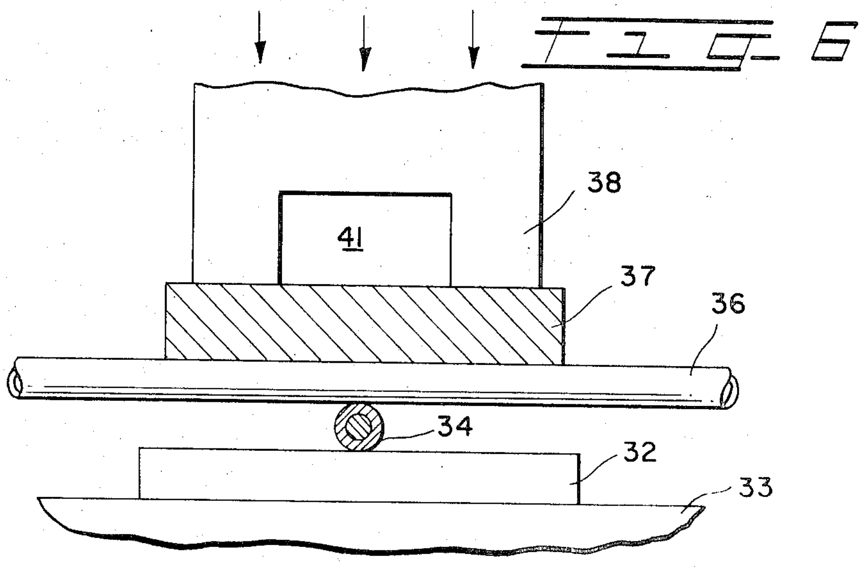
FIGS. 6 and 7 are front and side views, respectively, of an illustrative apparatus for forming the crossover depicted in FIG. 5.
Figure 7:
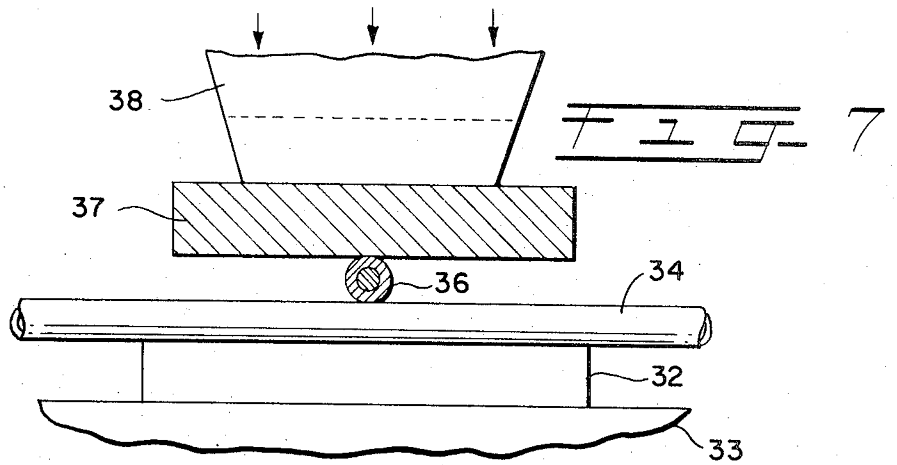
Figure 8:
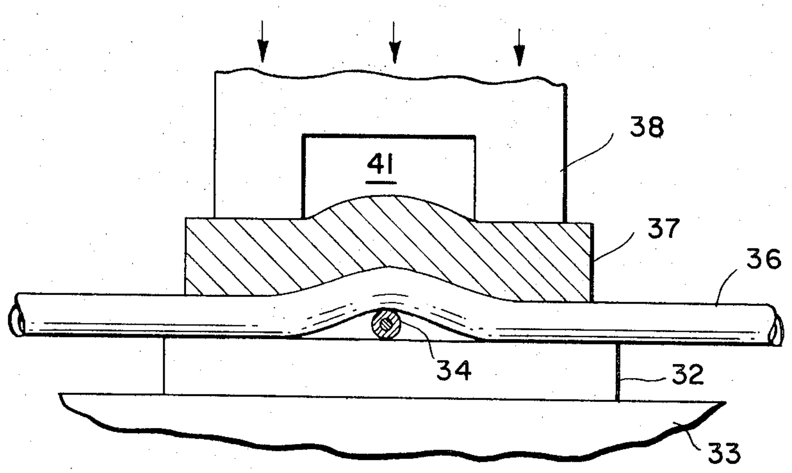
FIGS. 8 and 9 are front and side views, respectively, of the apparatus shown in FIGS. 6 and 7, after said crossover has been formed.
Figure 9:
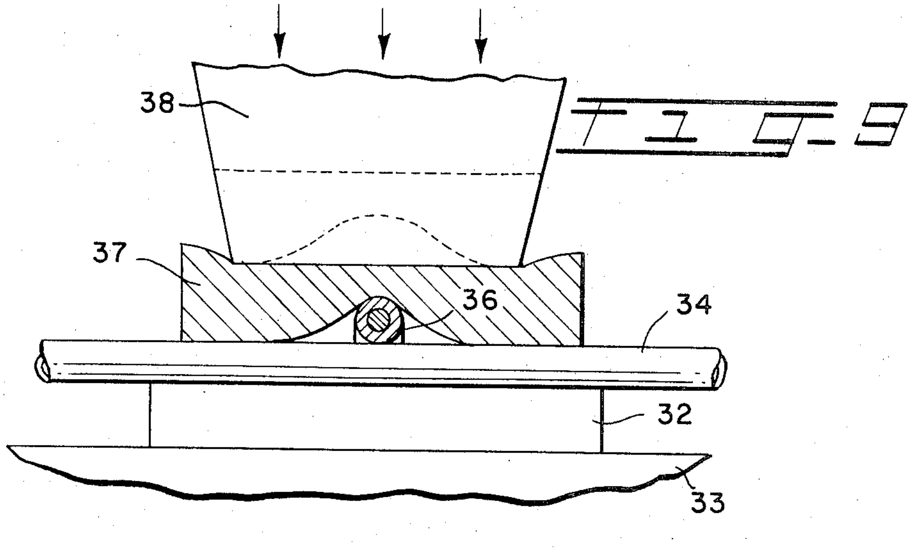

As shown in FIG. 5, in more complicated integrated circuits where more than one device is carried by the substrate, it may be necessary for one optical fiber to cross the path of another. In general, there should not be any cross coupling of optical energy from one waveguide into the other in such circuits. A plurality of separate compliant bonds may, of course, be formed to create the crossover 31 shown in FIG. 5. However, it is more convenient to simultaneously create multiple discrete bonds to form the crossover. This may readily be accomplished by the technique of the instant invention; more particularly, by the use of a contoured bonding ram as shown in FIGS. 6–9.

As in the previous embodiment, a substrate 32 is placed on a heated base 33. The substrate, in turn, supports the two optical fibers 34 and 36 which are to be bonded to the substrate with a crossover therebetween. A compliant member 34 is positioned between the fibers and a contoured bonding ram 38. The contoured ram includes a recess 41 which is sufficiently large to receive the crossover and that portion of the compliant member lying immediately thereover. As may be seen more clearly in FIGS. 8 and 9, when pressure is applied to the ram to force it downwardly into engagement with the base, the non-recessed portion thereof deforms the compliant member about both fibers 34 and 36, bonding them to the substrate, as previously, but the crossover portion, which falls within the recess of the ram, will not be bonded. Accordingly, since there is no bonding in the crossover region, there will be no cross coupling between the fibers and between either of the fibers and the substrate. One skilled in the art will appreciate that by suitably contouring the bonding ram, a plurality of crossovers may be formed simultaneously.

As is taught in U.S. Pat. No. 3,533,155, when force is applied to a compliant bonding member, there is a tendency for the compliant member to extrude out from underneath the bonding ram. This, in turn, causes a gradual, rather than an abrupt, change in the diameter and cross section of the workpiece being bonded. While relatively unimportant with regard to electrical connections, this gradual change in cross section is extremely important in fiber optics technology, since it eliminates or substantially reduces the transmission loss that would otherwise be experienced if there were an abrupt change in the cross section of the fiber. Indeed, by the appropriate choice of bonding parameters and compliant members, it is possible to control the shape that the fiber assumes in the bond region to thereby provide a particular optical characteristic.

As will be appreciated from a detailed reading of the above-referenced U.S. patent, the role of the compliant member in a compliant bonding process is to distribute the bonding forces applied to the workpieces to be bonded. It should not, however, be inferred that a compliant member is essential for satisfactory bonding according to the present invention. By careful control of the bonding parameters, satisfactory bonds may also be accomplished without the use of a compliant member, that is to say, by the direct application of heat and/or pressure to the optical fibers and substrate.

The coefficient of thermal expansion of glass is, of course, dependent upon temperature. Therefore, two linear coefficients of expansion are normally given for a glass, which coefficients represent mean values for the temperature ranges from −30°C to +70°C and from +20°C to +300°C. The coefficient measured between −30°C and +70°C averages at 20°C, i.e., the temperature at which optical glass is normally used.

Figure 19:
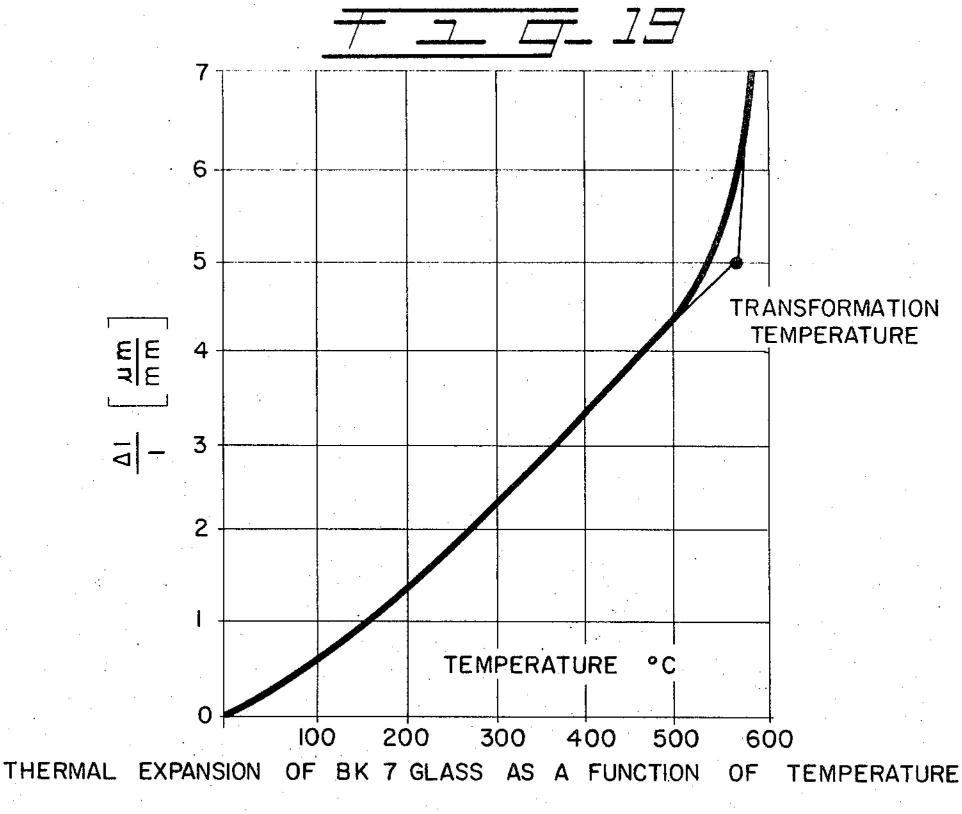
FIG. 19 is a graph depicting the thermal expansion of a typical optical glass as a function of temperature.

FIG. 19 shows the effect of temperature on the thermal expansion of glass, for example, borosilicate glass available under the trade name Schott BK7 glass. The transformation region is that range of temperature in which a glass gradually transforms its solid state into a plastic one. This region of transformation is approximately defined by the transformation temperature Tg (viscosity approximately $10^{13}$ poise). It is determined from the typical rate of change of thermal expansion in the transformation region, as shown in FIG. 19. The thermal expansion curve is obtained by measuring well annealed glass samples heated at a rate of 4°C/min. The thermal expansion of glass is, of course, related to the viscosity of glass which is inherently temperature dependent.

Figure 20:
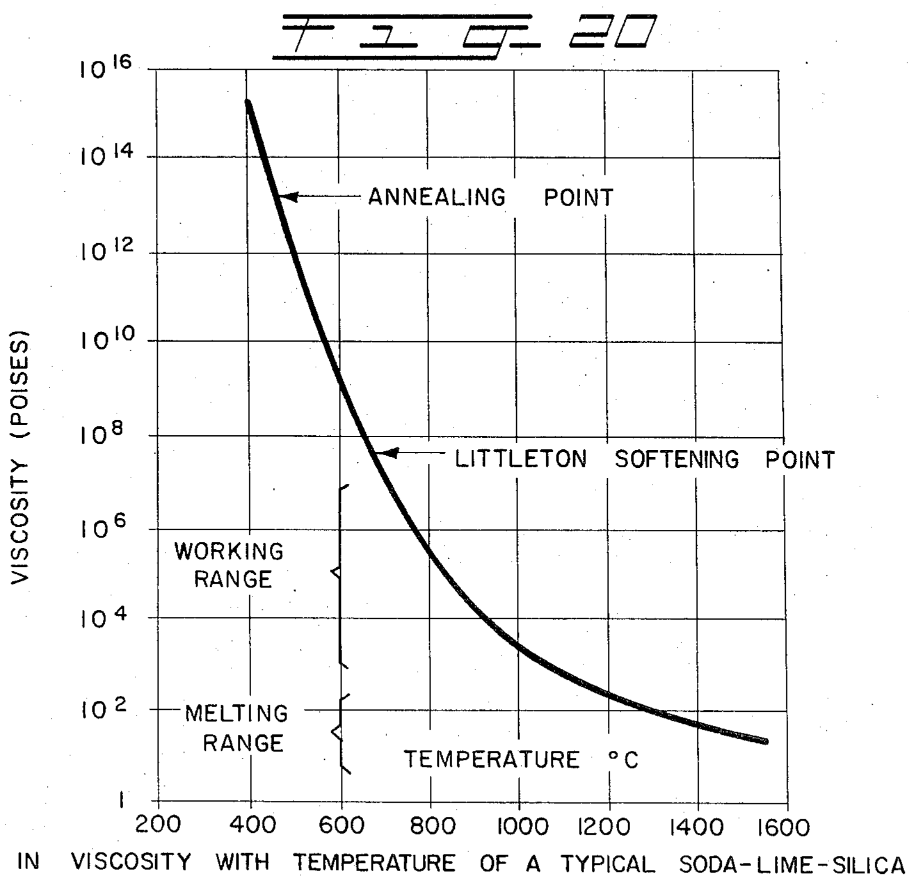
FIG. 20 is a graph depicting the change in viscosity of another typical glass as a function of temperature.

The temperature dependence of viscosity for a typical soda-lime-silica glass is illustrated in FIG. 20. This large variation with temperature is one of the bases for glass-forming techniques such as drawing, blowing, and rolling. In the melting range the viscosity is 50 to 500 poises; in the working range the viscosity is higher, being $10^4$ to $10^8$ poises; in the annealing range the viscosity is still higher, being $10^{12.5}$ to $10^{13.5}$ poises. Since the viscosity is the primary property determining the temperature level at which glass working and the annealing of internal stresses can take place, it is a major factor in the manufacture and working of glasses. These practical operating points are designed on the basis of viscosity and are determined by measuring the viscosity. The two most widely employed defined points are the "annealing point" which is the temperature at which internal stresses are substantially reduced in 15 min.—equivalent to a viscosity of $10^{13.4}$ poises—and the "Littleton softening point" determined by a fixed procedure and equivalent to a viscosity of $10^{7.6}$ poises.

We have discovered that, regardless of whether a compliant bonding member is used or not, satisfactory bonding occurs only if either or both of the workpieces to be bonded attain a temperature during bonding at which plastic deformation occurs, i.e., the region on FIG. 19 to the right of the transformation temperature Tg or the equivalent point on FIG. 20 which is to the right of the annealing point, but in either case, advantageously well below the softening point. The absence of a compliant member does, of course, make the bonding pressure more critical; too much pressure and the fiber and/or the substrate will be cracked; too little pressure and the fiber will not be bonded. Sticking of the workpieces to the bonding tool also becomes more troublesome if the compliant member is omitted. Since the criticality of the bonding parameters is lessened by positioning a compliant member between the bonding ram and the workpiece, this is the preferred embodiment of the invention, but direct bonding may, nevertheless, be employed in special situations.

As previously discussed with respect to FIG. 1, it is necessary to connect an active optical device, such as a light-emitting diode or a solid-state laser, to an external source of power in addition to providing means for extracting the optical signal from the device. We have discovered that the compliant bonding process disclosed herein may be employed to simultaneously form both the electrical connections required to supply power to the device and the optical path for extracting optical energy from the device.

Figure 10:
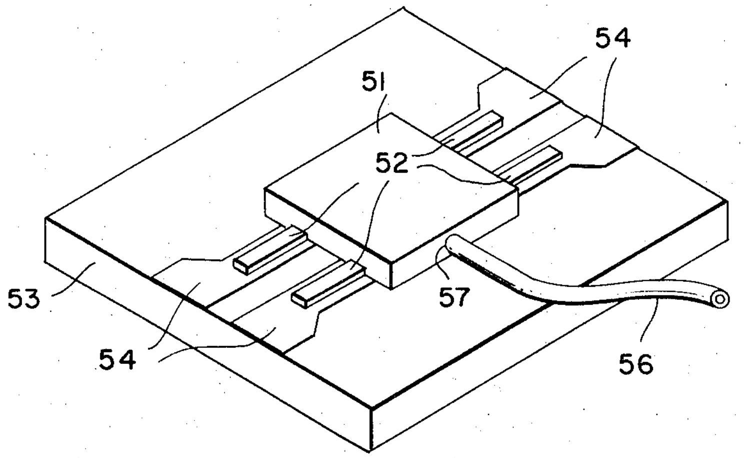
FIG. 10 is an isometric view of a beam-leaded optical integrated circuit illustrating how the beam leads thereof, and an optical waveguide, may be bonded to a substrate, according to the methods of this invention.

FIG. 10 depicts an active optical device 51 having a plurality of beam leads 52 cantilevered outwardly therefrom, positioned on an insulating substrate 53, for example, of glass or ceramic, the substrate having a corresponding plurality of metalized regions 54 aligning with the beam leads of the device. An optical fiber 56 is shown positioned proximate an exit port 57 on one side of the device.

For device 51 to function, assume that it is necessary to bond each of the four beam leads to the metalized regions on the substrate and, in addition, that it is also necessary to bond optical fiber 56 to the substrate so that the end thereof is aligned with the exit port of device 51.

Figure 11:
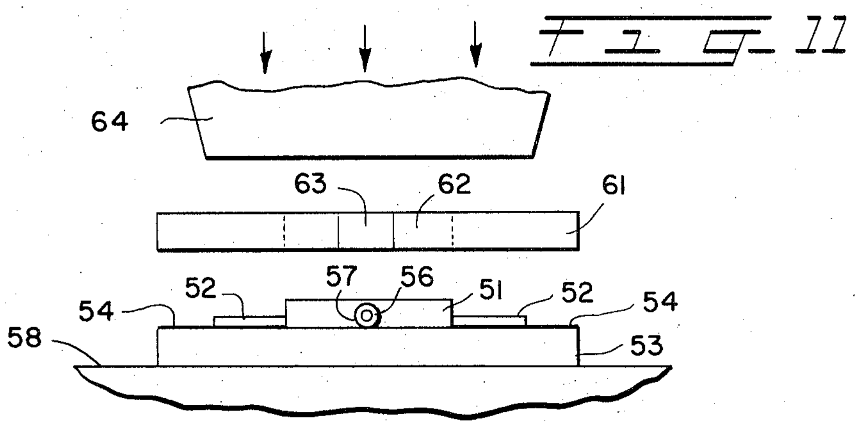
FIG. 11 is a partial side view of an illustrative apparatus for simultaneously forming the electrical and optical bonds shown in FIG. 10.
Figure 12:
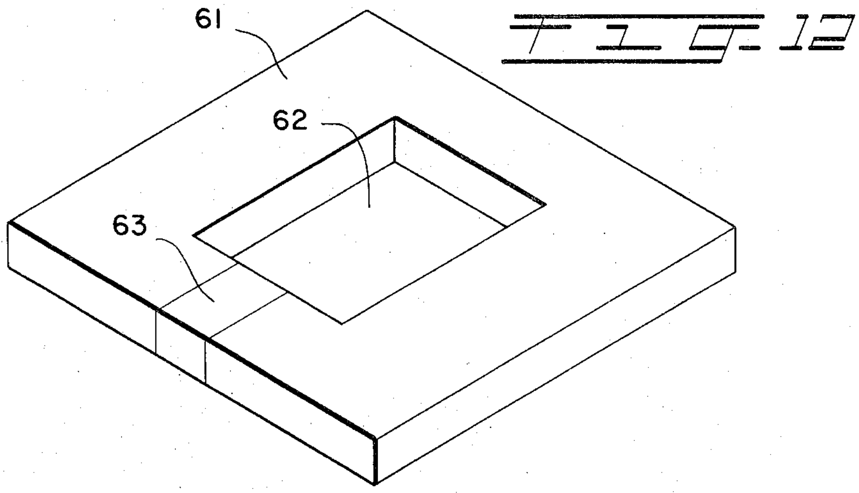
FIG. 12 is an isometric view of an apertured compliant member for use with the apparatus of FIG. 11.

FIGS. 11 and 12 depict how the beam leads and the optical fiber may be simultaneously bonded to the substrate. As shown, substrate 53, with optical device 51 aligned thereon, is placed upon a support member 58 which is advantageously maintained at an elevated temperature by heating means (not shown), as discussed earlier with reference to FIG. 3. A compliant member 61, having an aperture 62 therein, is positioned over support member 58 so that the aperture in the compliant member aligns with the body of optical device 51. Compliant member 61 has a region 63 therein which has been treated to give the region different physical properties than the main body of the compliant member. For example, if the main body comprises 2024 aluminum (to insure satisfactory bonding of the beam leads), region 63 might comprise a region of the compliant member which has been plated with gold, or some other precious metal, to reduce the tendency for oxides to form thereon. It will be recalled that the formation of an oxide on the compliant member is advantageous, and desired, for metal-to-metal bonding but that the same oxide, if present on the portion of the compliant member which bonds the optical fiber, would tend to stick thereto and tear the optical fiber away from the substrate when the compliant member is subsequently removed. Alternatively, the region 63 may be hardened, in addition to being plated, since the flow characteristics of the compliant member required for satisfactory bonding of glass and fused silica fibers, in general, is different from the flow requirements required for the satisfactory bonding of beam leads. Of course, more than one compliant member may be employed at the same time. Thus, rather than using a single compliant member having multiple hardness characteristics, two separate compliant members may be employed, one member having an oxide-free surface positioned to bond only the optical fiber, the other compliant member having an adherent-oxide surface for bonding the beam leads. To simplify orientation of the apertured compliant member with respect to the device, however, a single, composite compliant member is preferred over a plurality of separate members. In either event, after the compliant member (or members) has been positioned over the circuit a heated ram 64 is brought down into engagement with the compliant member and the beam leads and optical fiber to bond the beam leads to the metalized regions 54 of the substrate and, at the same time, to bond the free end of optical fiber 56 to the substrate so that the end thereof aligns with the exit port of the device.

Figure 13:
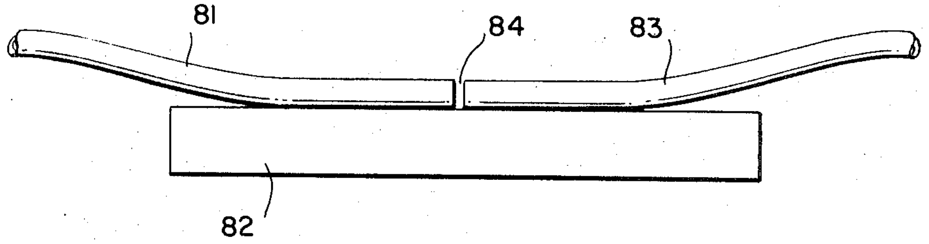
FIG. 13 is a cross-sectional view of a device for forming a splice between a pair of optical waveguides.

As shown in FIG. 13, the compliant bonding process of the instant invention may be employed to "splice" two optical fibers together, that is to position two fibers end to end, so that optical energy propagating in one fiber will be coupled into the other fiber without significant loss at the interface. With reference to the drawing, a first fiber 81 is bonded to a suitable glass or fused silica substrate 82 by the technique described above with reference to FIGS. 1 and 10, leaving one end of fiber 81 approximately in the center of the substrate 82. Next, a second optical fiber 83 is bonded to the substrate so that an end thereof abuts the end of optical fiber 81. If desired, a drop of index matching fluid may be inserted in the gap 84 between the two optical fibers, although if sufficient precision is maintained during the bonding process, this latter step may not be necessary, as the two fibers may abut sufficiently close that minimal light scattering occurs at the interface. In an alternate embodiment, the two fibers may be positioned on the substrate and aligned prior to bonding. Then, the two fibers may be bonded simultaneously using a common compliant member. A temporary adhesive, such as alcohol, may be employed to tack the fibers to the substrate to maintain their relative alignment during the bonding process.

Figure 14:
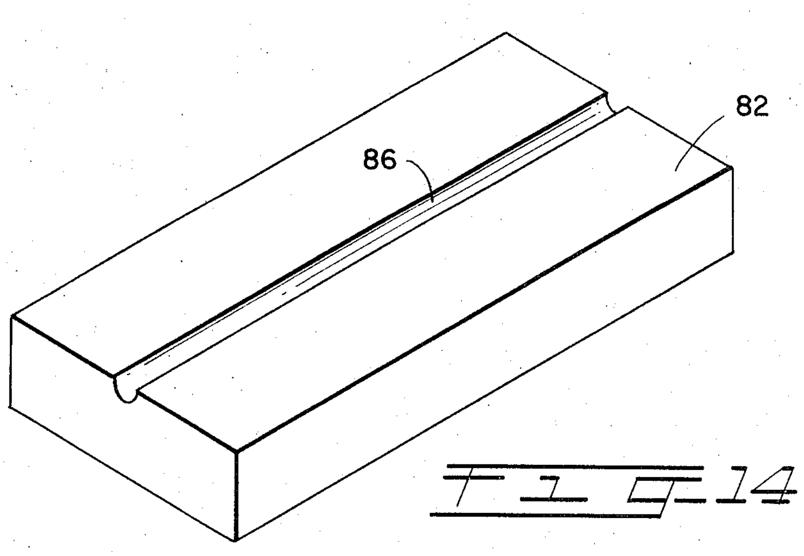
FIG. 14 is an isometric view of a substrate having a longitudinal groove therein for assisting in the orientation of the waveguides shown in FIG. 13.
Figure 15:
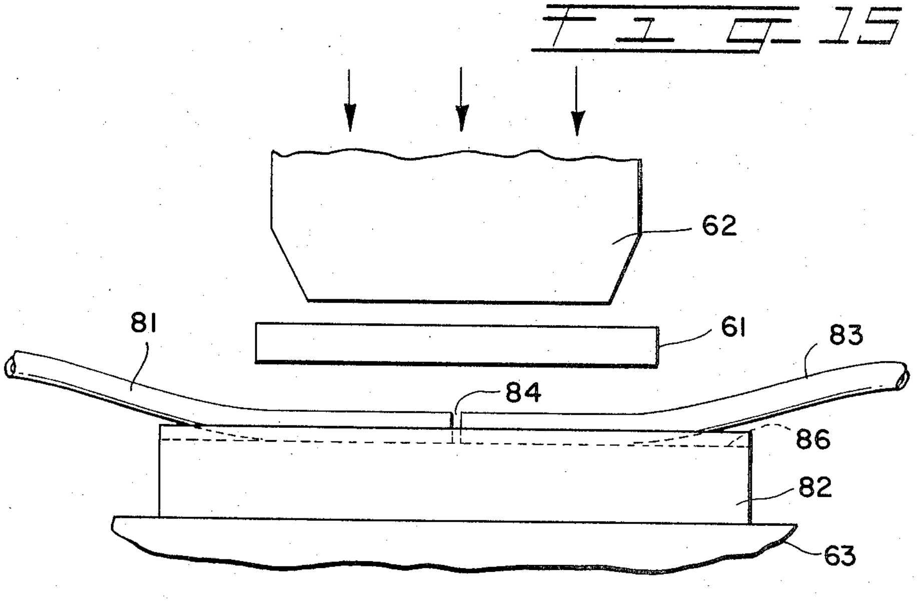
FIG. 15 is a partial side view of an illustrative apparatus for forming the splice shown in FIG. 13.

In another embodiment, a special substrate may be employed. As shown in FIG. 14, a substrate 82 has a groove 86 formed therein to assist in aligning the fibers to be bonded with respect to each other on the substrate. As shown in FIG. 15, in this embodiment, fibers 81 and 82 are positioned within groove 86 with the opposing end of the fibers abutting, as previously. Next, a compliant member 61 is positioned over the substrate and a heated ram 62 brought down into engagement with the compliant member and the two fibers 81 and 83, as previously. After the bonding operation has been completed, the compliant member is stripped away. If necessary, a drop of index matching fluid may be inserted into the gap between the two fibers.

Figures 16, 17, 18:
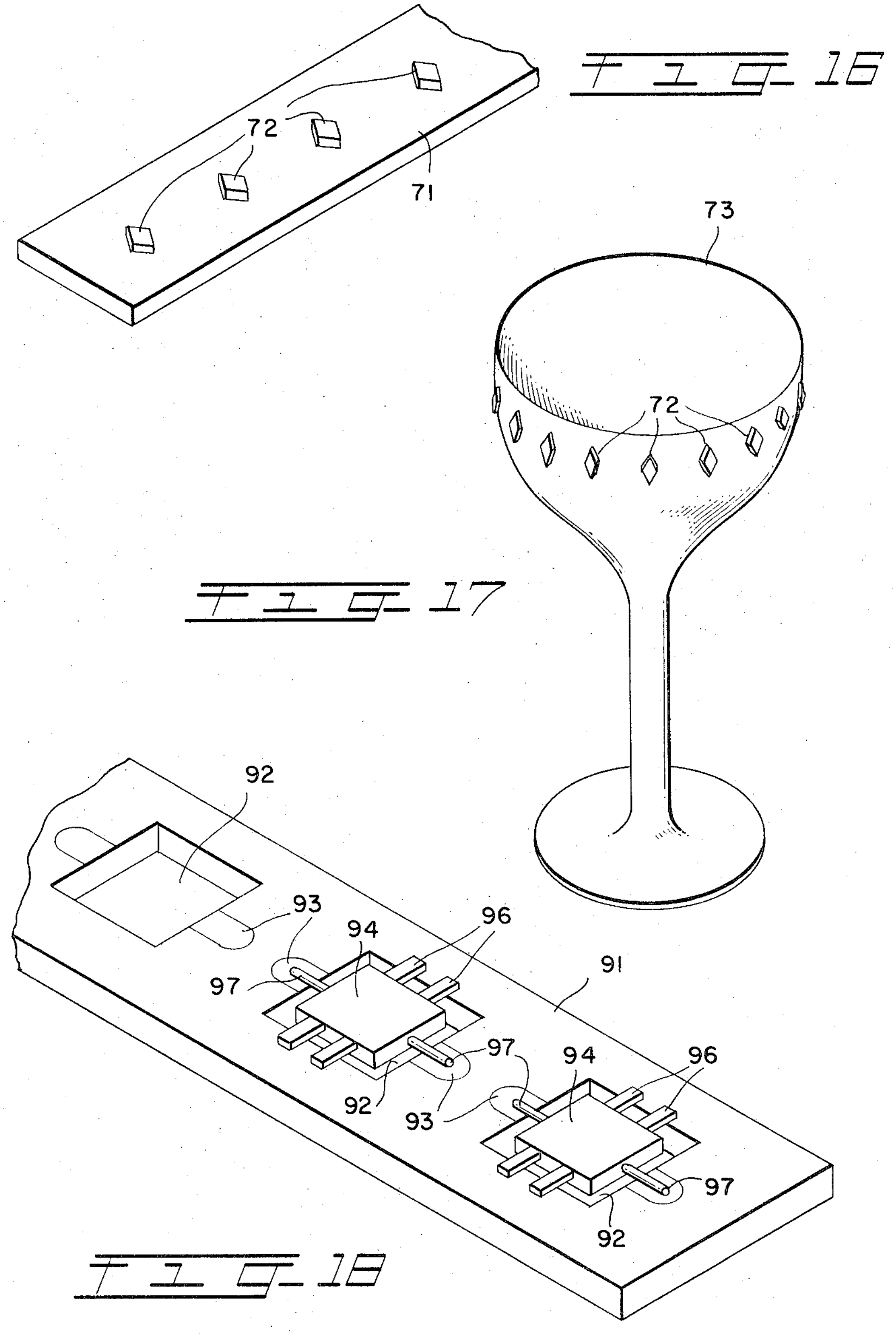
FIG. 16 is an isometric view of a compliant tape having a plurality of vitreous, decorative ornaments temporarily secured thereto.
FIG. 17 is an isometric view of a typical workpiece which may be decorated with the ornaments illustrated in FIG. 16.
FIG. 18 is an isometric view of an apertured, compliant tape having a plurality of integrated optical circuits and waveguides temporarily secured thereto.

The invention has been described with reference to the bonding optical fibers and active and passive optical devices. However, one skilled in the art will appreciate that the invention is not so limited. For example, the invention may be used to apply decorative glass elements to various kinds of articles, for example, a flower vase or a drinking vessel. As shown in FIG. 16, the glass-to-glass bonding technique of the instant invention is employed to create a decorative finish on a drinking vessel. A compliant member 71, for example, a copper tape having a suitable oxide-free surface, for example, gold plating, has a plurality of decorative glass elements 72 secured thereto, for example, by the use of a temporary adhesive. By means of the compliant bonding process disclosed above with reference to earlier embodiments, the elements 72 are transferred from the tape onto the outer surface of a glass drinking vessel 73 to provide an attractive decorative finish thereto. The technique of transporting the workpieces to be bonded on the compliant medium itself may, of course, be employed with optical devices and fibers. FIG. 18 depicts a tape 91 of compliant material, for example, copper, having a plurality of apertures 92 therein, each surrounded by a plurality of specially treated regions 93. For example, each region 93 might comprise a gold-plated area of the tape. An optical device 94 is shown centered in, and temporarily secured to each aperture 92. In use, the tape would be advanced, by conventional means (not shown), to successively present a device 94 to a substrate. Then the leads 96 and waveguides 97 of the device would be bonded to the substrate using the compliant bonding technique discussed above.

Figure 21A:
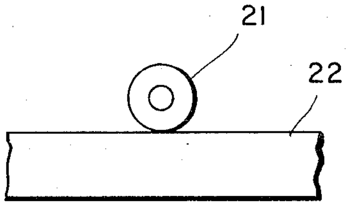
FIGS. 21(*a*) and 21(*b*) depict an optical fiber before and after it has been bonded to a substrate, the fiber being of a type which is "softer" than the substrate.
Figure 21B:
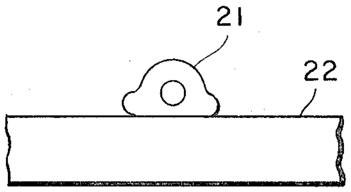
Figure 22A:
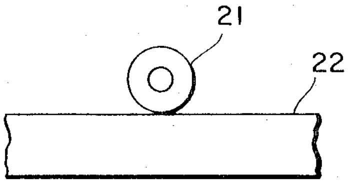
FIGS. 22(*a*) and 22(*b*) depict the same situation for a fiber which is "harder" than the substrate.
Figure 22B:
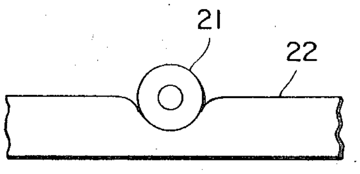

Most of the above assumed that the fiber optic waveguide is "softer" than the substrate to which it is bonded, as is true, for example, where the waveguide is comprised of borosilicate glass and the substrate is comprised of fused silica. However, the invention is not so limited and works equally as well when the substrate is "softer" than the waveguide, for example when the substrate is borosilicate glass and the waveguide is fused silica. FIGS. 21(*a*) and (*b*), respectively, show the "before" and "after" situation when the waveguide is "softer" than the substrate, and FIGS. 22(*a*) and (*b*) the corresponding situation for the reverse condition. In FIG. 22(*b*) it will be noted that the waveguide is depressed into the substrate which, in effect, acts as its own compliant member although a compliant member may, in fact, also be used in this situation. Put in other words, regardless of which workpiece is harder, for a satisfactory bond at least one of the workpieces must deform and thereby must attain a temperature at least as high as the transformation temperature (but less than the softening temperature).

As used in the specification and claims, a bond which does not deleteriously affect the optical characteristics of the workpieces means a bond in which light scattering and absorptive loss in the bond region do not occur to any significant extent. One skilled in the art can make various changes and substitutions in the methods and apparatus shown, without departing from the spirit and scope of the invention.

What is claimed is:

1. A method of splicing first and second glass waveguides to couple optical energy therebetween with a minimum of scattering, comprising the steps of:

orienting said first waveguide on a glass substrate;

orienting said second waveguide on the substrate so that the free end thereof is adjacent the free end of said first waveguide; and applying sufficient mechanical, thermal and/or vibratory energy to said waveguides and said substrate to raise said waveguides and said substrate to a temperature falling between the transformation temperature and the softening temperature of the waveguide to bond said waveguides to the substrate, whereby the relative alignment between the free ends of the waveguides is maintained, even in the presence of forces tending to disturb the alignment.

2. The method according to claim 1 including the further step of, prior to said energy-applying step, positioning a compliant member over the oriented waveguides, the mechanical and/or thermal energy being applied to said waveguides through said compliant member.

3. The method according to claim 1 wherein said substrate comprises a longitudinal groove formed therein and said orienting step comprises positioning the first and second waveguides in said groove, prior to bonding.

4. A method of forming a crossover between first and second glass waveguides on a glass substrate, comprising the steps of:

bonding said first waveguide to said substrate;

orienting said second waveguide, with respect to said substrate, so that it crosses said first waveguide;

impacting said second waveguide with a slotted bonding tool to apply sufficient mechanical and/or thermal energy thereto to raise said second waveguide and said substrate to a temperature falling between the transformation temperature and the softening temperature of the waveguide to bond said second waveguide to said substrate, the slot in said bonding tool extending longitudinally in said tool and parallel to said first waveguide whereby only those portions of said second waveguide lying away from said first waveguide are bonded thereby to form said crossover.

5. The method according to claim 4 wherein said bonding tool impacts said second waveguide through a compliant medium.

* * * * *

UNITED STATES PATENT OFFICE
CERTIFICATE OF CORRECTION

Patent No. 3,860,405 Dated January 14, 1974

Inventor(s) Alexander Coucoulas et al.

It is certified that error appears in the above-identified patent and that said Letters Patent are hereby corrected as shown below:

Column 9, line 59, "81 and 82" should read -- 81 and 83 --. Column 10, line 2, "bonding optical" should read -- bonding of optical --.

Signed and Sealed this

*fourteenth* Day of *October 1975*

[SEAL]

*Attest:*

RUTH C. MASON
*Attesting Officer*

C. MARSHALL DANN
*Commissioner of Patents and Trademarks*